United States Patent
Stapleton

(10) Patent No.: US 10,759,106 B2
(45) Date of Patent: Sep. 1, 2020

(54) SELF-ADJUSTING CUTTER ASSEMBLY

(71) Applicant: Extru-Tech, Inc., Sabetha, KS (US)

(72) Inventor: Shannon David Stapleton, Sabetha, KS (US)

(73) Assignee: Extru-Tech, Inc., Sabetha, KS (US)

(*) Notice: Subject to any disclaimer, the term of this patent is extended or adjusted under 35 U.S.C. 154(b) by 259 days.

(21) Appl. No.: 15/877,164

(22) Filed: Jan. 22, 2018

(65) Prior Publication Data

US 2019/0224900 A1    Jul. 25, 2019

(51) Int. Cl.

| | |
|---|---|
| B29C 48/00 | (2019.01) |
| B26D 7/26 | (2006.01) |
| B29C 48/30 | (2019.01) |
| B29C 48/31 | (2019.01) |
| B29C 48/345 | (2019.01) |
| B29B 9/06 | (2006.01) |
| B29C 48/92 | (2019.01) |
| B26D 1/28 | (2006.01) |

(52) U.S. Cl.
CPC .......... *B29C 48/0022* (2019.02); *B26D 7/265* (2013.01); *B29B 9/06* (2013.01); *B29C 48/30* (2019.02); *B29C 48/3003* (2019.02); *B29C 48/313* (2019.02); *B29C 48/345* (2019.02); *B29C 48/92* (2019.02); *B26D 1/28* (2013.01)

(58) Field of Classification Search
CPC ... B29C 48/022; B29C 48/0022; B29C 48/04; B29B 9/00–16
USPC .............................. 425/67, 308–311; 264/140
See application file for complete search history.

(56) References Cited

U.S. PATENT DOCUMENTS

| | | | |
|---|---|---|---|
| 3,196,487 A | 7/1965 | Snelling | |
| 5,017,119 A * | 5/1991 | Tokoi | ........................ B26D 1/29 264/142 |
| 5,284,433 A | 2/1994 | Cates et al. | |
| 2002/0044987 A1* | 4/2002 | Hawley | ............... B29C 45/1816 425/585 |
| 2006/0153942 A1* | 7/2006 | Farnsworth | ............... B29B 9/06 425/67 |
| 2009/0110766 A1* | 4/2009 | Thom, Jr. | ............. B30B 11/202 425/222 |
| 2015/0056322 A1 | 2/2015 | Fridley | |

* cited by examiner

*Primary Examiner* — Timothy Kennedy
*Assistant Examiner* — Farah Taufiq
(74) *Attorney, Agent, or Firm* — Hovey Williams LLP

(57) ABSTRACT

A cutter assembly includes a rotatable cutting head carrying outwardly extending cutter blades, as well as a rotatable drive hub and interconnected spring housing. The drive hub has a bearing housing, whereas spring housing includes coil spring. The spring housing is operably coupled with the cutting head, in a manner such that the spring exerts an unrestrained force against the cutting head and blades so that there is unrestrained movement of these components toward the outlet face of an extruder die plate. Consequently, there is a substantially constant self-adjusting force exerted on the cutter and blades against the plate, which promotes cleaner cutting of extrudate, even in the event that there is a degree of misalignment between the cutting edges and the outer surface of die plate. This arrangement lengthens the service life of the blades and the die plate.

15 Claims, 3 Drawing Sheets

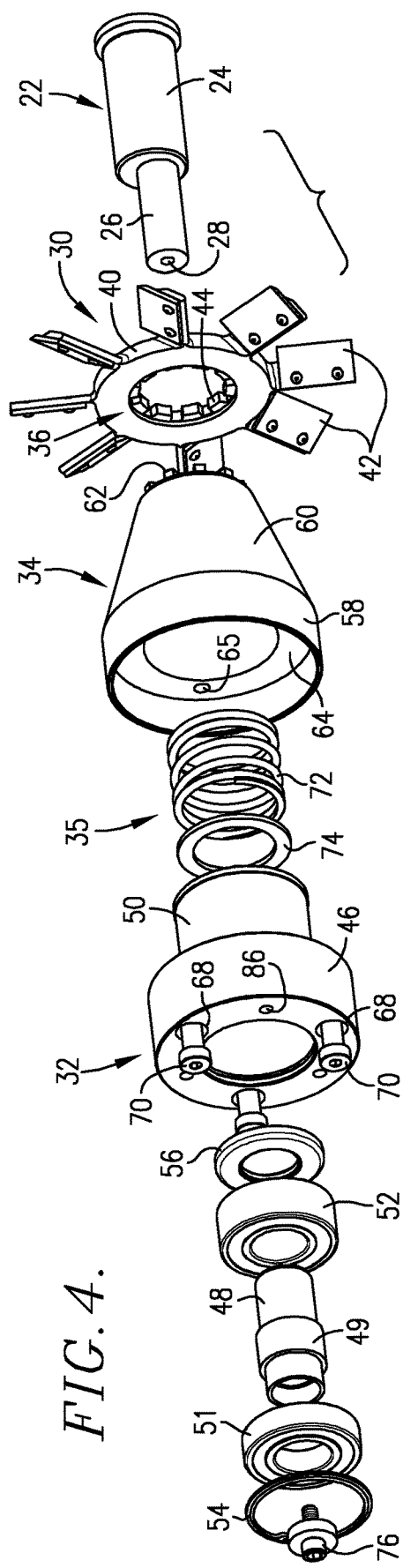
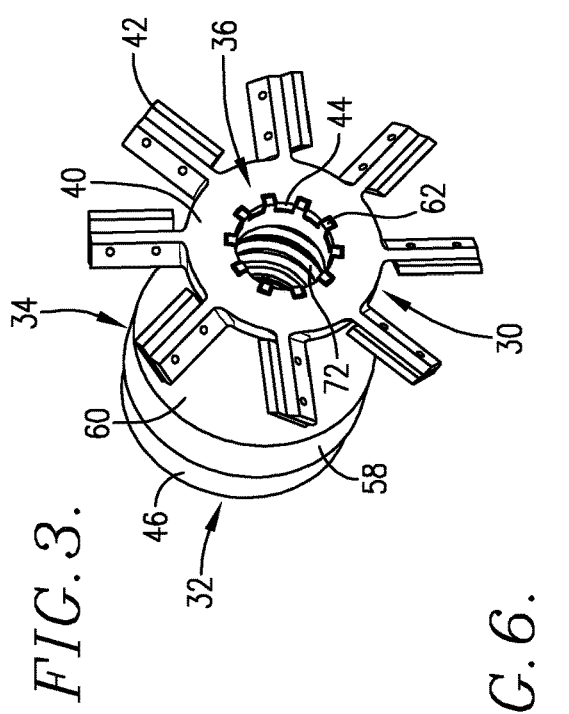
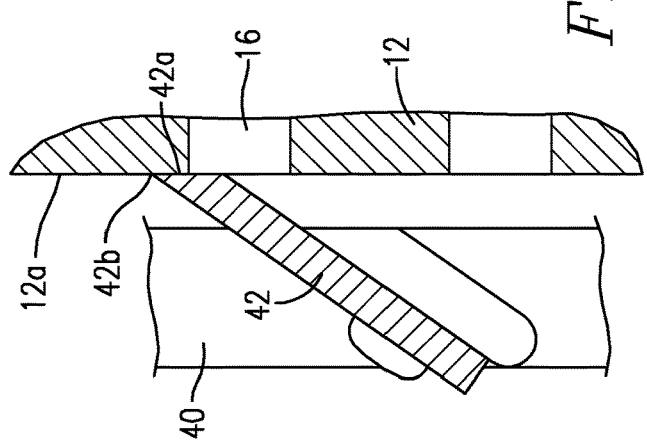
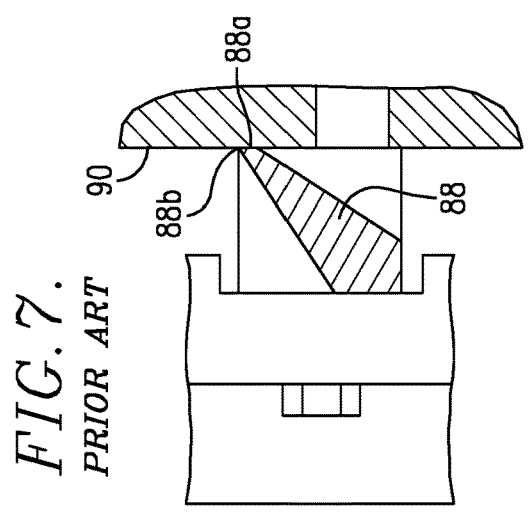
FIG. 4.
FIG. 3.
FIG. 6.
FIG. 7.
PRIOR ART

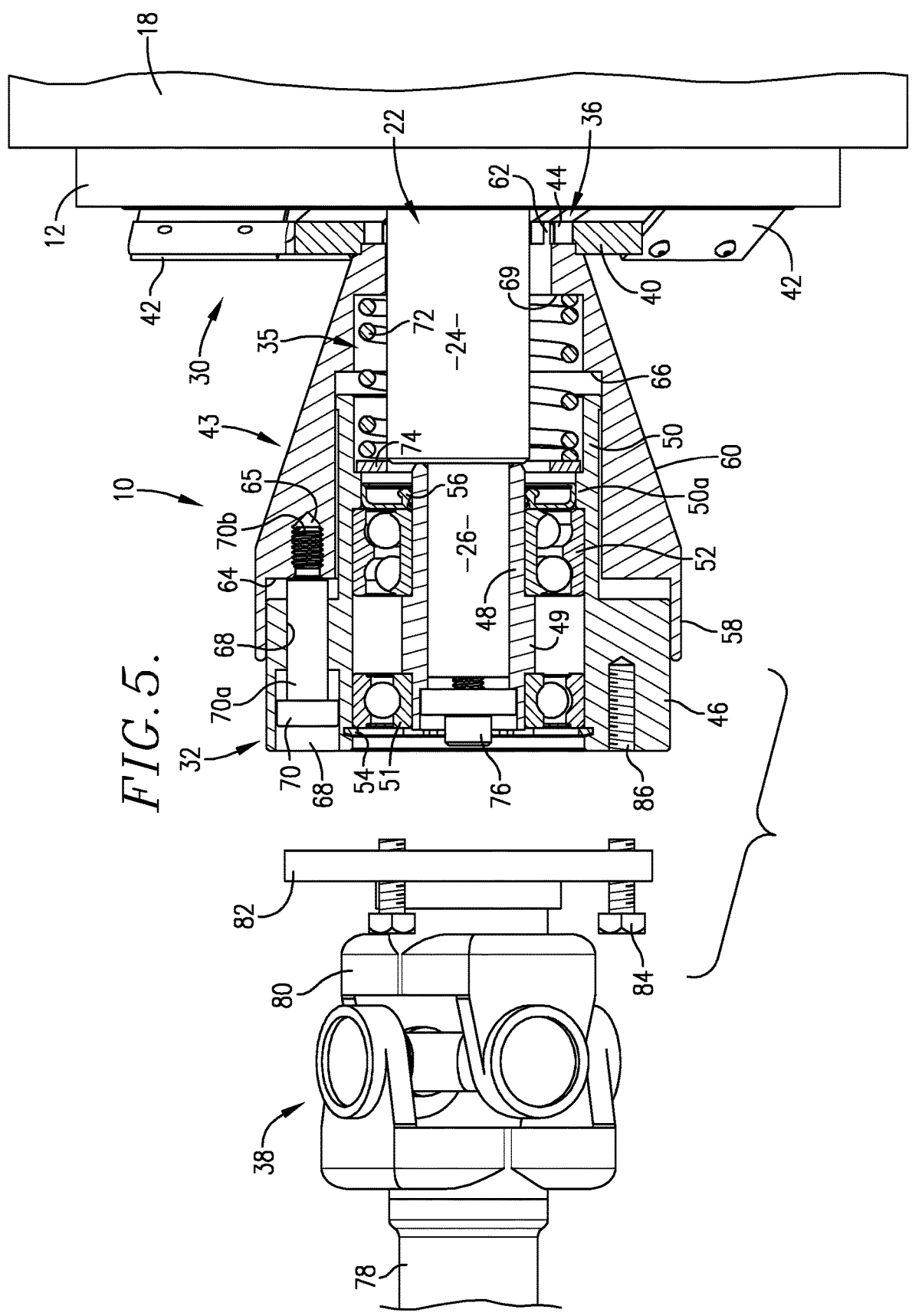

SELF-ADJUSTING CUTTER ASSEMBLY

BACKGROUND OF THE INVENTION

Field of the Invention

The present invention is broadly concerned with self-adjusting rotary cutter assemblies used in conjunction with extruders in order to evenly cut extrudate emerging from the extruder die plate and decrease the set-up time from one die plate to another die plate with the self-adjusting feature of the cutter head. More particularly, the invention is concerned with such assemblies and methods characterized by unrestrained movement of a rotary cutting head toward the outlet face of the extruder die plate, which lengthens the service life of the cutter assembly by resiliently maintaining a desired force exerted by the cutter head against the outlet face of the die plate, even if there is a degree of oblique misalignment between the cutter head and die plate.

Description of the Prior Art

It is almost a universal practice to provide cutter assemblies for use in conjunction with extruders of all types. These extruders are normally equipped with a restricted orifice die plate having a central, outwardly extending mounting shaft. The cutter assemblies typically include a rotatable cutter head having a central hub with a plurality of outwardly extending cutter blades positioned adjacent the output face of the die, with the fixed position cutter head operably coupled with a driven assembly serving to rotate the head at high speed. Prior cutter assemblies have been designed with the assumptions that the cutter mounting shaft is truly perpendicular and the cutting edges of the fixed position blades are truly parallel to the die face. In practice, however, it often occurs that there is a degree of misalignment between these parts, resulting in inefficient cutting of extrudate and significant shortening of the service life of both the dies and the cutter assemblies.

Furthermore, some cutter assemblies are designed to maintain a very slight distance between the cutting edges of the blades and the die face, rather than attempting to maintain the cutting edges against the die face under a constant biasing force.

U.S. Pat. Nos. 3,196,487 and 5,284,433, and US Patent Publication No. 2015/0056322 describe various cutter assemblies typical of the prior art. The '487 patent provides a spring-loaded biasing force exerted against the cutter hub and blade, but provides adjustable stop nut means to limit the movement of the rotatable cutting head toward the output face of the die. Hence, this patent advocates a cutter assembly which maintains a slight distance between the cutting edges of the blades and the die face, by restraining the movement of the cutter head and blades toward the die face as the blade design, if not restrained by the adjustable stop nut, would damage the surface of the die and cutter edge.

SUMMARY OF THE INVENTION

The present invention provides an improved cutter assembly, the combination of a cutter assembly and a die, and corresponding methods which, contrary to the prior art, are characterized by unrestrained movement of the cutter head of the assembly, and the blades thereof, toward the outlet face of the die. It has been found that maintaining a substantially constant engagement force between the cutting edges of the blades and the die face, together with knife geometry and material, serves to materially increase the service life of the cutter assembly while permitting cutting of extrudate into very small pieces.

In general, the cutting assemblies of the invention include a rotatable cutting head carrying at least two cutting blades adapted to engage the outlet face of a die, a rotatable drive hub, and biasing structure. Coupling structure is provided to operably couple the drive hub with the cutting head for simultaneous rotation thereof. The biasing structure is designed to exert an unrestrained force upon the cutting head with consequent unrestrained movement of the cutting head toward the die outlet face during use of the rotary cutter assembly. In an embodiment, the coupling structure comprises cooperating splines on the cutting head and the drive hub, and the cutting head carries a plurality of cutting blades. The biasing structure may include a coil spring, but other biasing arrangements would also be possible.

In certain embodiments, the cutter assemblies include a drive hub having a bearing housing supporting at least one bearing for rotation of the drive hub relative to the die mounting shaft. Also, a spring housing is coupled with the drive hub, with the coil spring biasing structure operable to unrestrainedly urge the drive hub, spring housing, and cutting head toward the outlet face, with a predetermined, substantially constant force which maintains the cutting edges of the blades in constant engagement with the die plate surface, even in situations where the cutting edges and die plate are on respective, relatively oblique planes.

BRIEF DESCRIPTION OF THE DRAWINGS

FIG. 3 is a perspective view depicting the cutter assembly from the cutter blade end thereof;

FIG. 4 is an exploded view of the cutter assembly and die plate mounting shaft;

FIG. 5 is an enlarged, vertical sectional view illustrating the cutter assembly mounted on the die plate mounting shaft, with a drive shaft assembly shown in exploded relationship to the outer end of the cutter assembly;

FIG. 6 is an enlarged, fragmentary sectional view illustrating the preferred knife configuration for the cutter assembly; and FIG. 7 is an enlarged, fragmentary sectional view of a typical prior art knife blade, of the type illustrated in U.S. Pat. No. 3,196,487.

While the drawings do not necessarily provide exact dimensions or tolerances for the illustrated components or structures, FIGS. 1-6 are to scale with respect to the relationships between the components of the structures illustrated therein.

DETAILED DESCRIPTION OF THE PREFERRED EMBODIMENT

Figure 1:
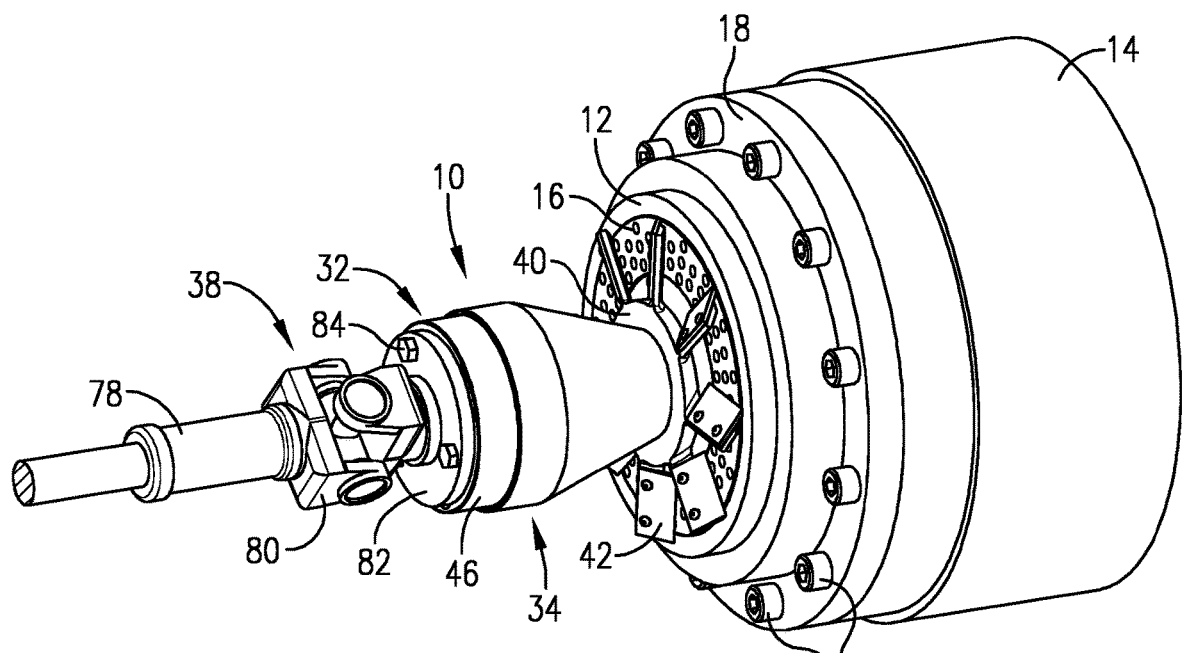
FIG. 1 is a fragmentary perspective view illustrating a die plate secured to the end of an extruder barrel, with a cutter assembly in accordance with the invention mounted on the die plate for cutting of extrudate as it emerges from the die plate.
Figure 2:
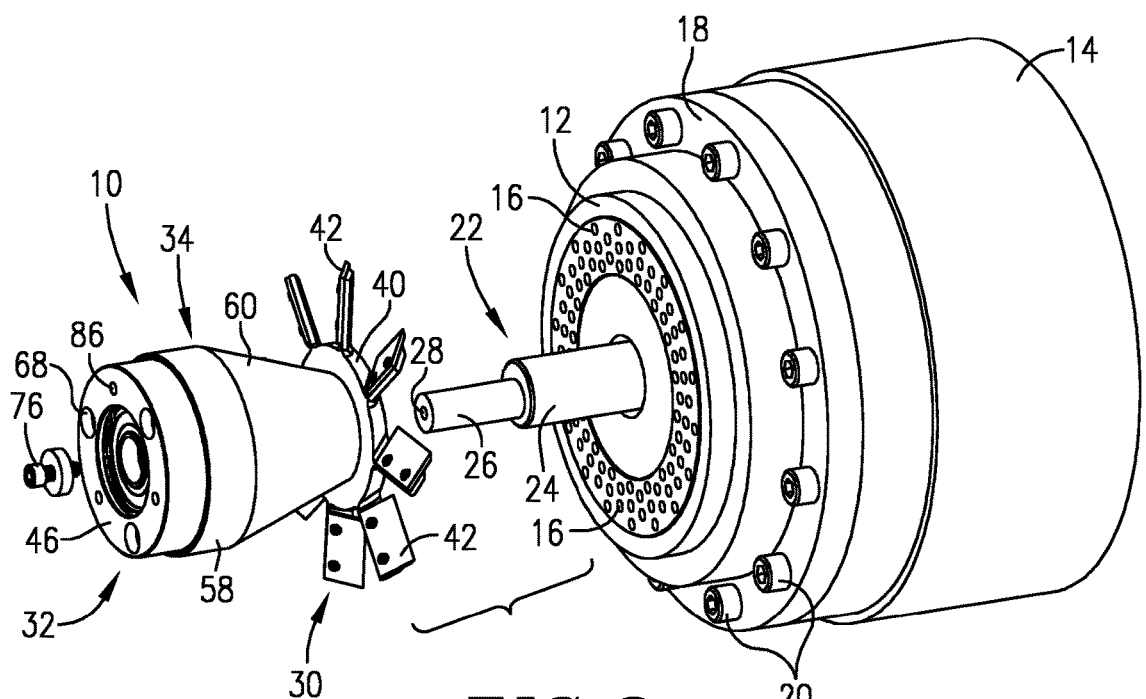
FIG. 2 is a perspective view similar to that of FIG. 1, but illustrating the cutter assembly in a position to be installed on the mounting shaft of the die plate.

Turning now to the drawings, and particularly FIGS. 1-2, a cutter assembly 10 is illustrated in conjunction with a conventional extrusion die plate 12, the latter having an outer face 12a (FIG. 6) and being mounted on the output end of an extruder barrel 14, the plate having a series of die openings 16 therethrough. The purpose of cutter assembly 10 is to evenly cut extrudate from the barrel 14 as it passes through the multiple die openings 16 to create a uniform flow of extrudate pieces suitable for downstream processing, such as drying.

The illustrated die plate 12 is exemplary of a number of possible different die plate configurations having a greater or lesser number of openings 16, and the latter may also be of different shapes. The plate 12 is secured to barrel 14 by means of an intermediate mounting head 18 and screws 20. The die plate 12 also has a central, outwardly extending mounting shaft 22 having an enlarged inboard section 24 and a smaller diameter outboard section 26, the latter having a threaded bore 28 in the butt end thereof.

In the illustrated embodiments, the cutter assembly 10 is depicted in conjunction with a single screw extruder having the barrel 14. It should be understood, however, that the invention is not so limited, in that the cutter assemblies of the invention can be used with a wide variety of different extruders, including twin screw extruders. As is well-known in the art, these extruders include, in addition to a barrel 14, at least one internal, elongated, helically flighted extrusion screw (not shown) serving to move material from the inlet end of the extruder toward and through the die plate 12. During such movement, the material is typically subjected to increasing levels of pressure, temperature, and shear in order to at least partially cook the extrudate emerging from the plate 12.

The cutter assembly 10 generally includes a rotatable cutting head 30, a rotatable drive hub 32 coupled with a rotatable spring housing 34, biasing structure 35, and coupling structure 36 serving to operably connect the hub 32 and housing 34 with the cutting head 30, and a drive shaft assembly 38 operably coupled with drive hub 32.

The cutting head 30 includes an annular, central hub 40 with a series of radially outwardly extending, replaceable cutting blades 42 mounted on the hub 40. As illustrated in FIG. 6, the blades 42 are oriented at an angle of 35° relative to the die face (more generally, from about 20-40°), and present relatively wide bottom surfaces 42*a*. The surfaces 42*a* ride on the outer face 12*a* of die plate 12, and a leading cutting edge 42*b*; in practice, the bottom surfaces 42*a* should have a width greater than the thickness of the blades at the point where the blades engage face 12*a*. In addition, the inner surface of the hub 40 is equipped with a series of circumferentially spaced apart drive lugs or splines 44 forming a part of the coupling structure 36.

The drive hub 32 includes an annular bearing housing 46 with an elongated, central, inwardly extending, tubular spindle 48 having an enlarged segment 49; it also has an outer skirt 50 disposed about spindle 48, with an inwardly extending section 50*a*. The housing 46 is equipped with an outboard, single race bearing unit 51 and an inboard, double race bearing unit 52, with the units 51, 52 operably coupled with spindle 48 on opposite sides of the segment 49. A bearing retainer ring 54 serves to maintain the bearing unit 51 in place against segment 49, whereas the unit 52 bears against the segment 49 and section 50*a*. A sealing ring 56 is also provided adjacent the inboard end of bearing unit 52.

The spring housing 34 includes an annular outer end 58 and a tapered, frustoconical section 60, the latter having a series of innermost, circumferentially spaced apart drive lugs or splines 62, which form a part of coupling structure 36 and are oriented to mate with and engage the splines 44. The housing 34 further has an upper, inwardly extending annular shoulder 64, as well as a smaller, intermediate inwardly extending, annular stop shoulder 66, and an innermost spring-retaining shoulder 69. As best seen in FIGS. 4 and 5, the bearing housing 46 has a series of smooth connection bores 68, which receive shoulder bolts 70 serving to interconnect the bearing housing 46 and the spring housing 34, while permitting limited fore-and-aft movement, and oblique movement, of the spring housing 34. To this end, each shoulder bolt 70 has an unthreaded section 70*a* received within a corresponding smooth bore 68, and a threaded end section 70*b* received within a threaded bore 65 provided in spring housing 34.

The biasing structure 35 is situated within the confines of spring housing 34 and is in the form of a helical spring 72. The spring 72 is retained in place between an outer spring washer 74 abutting section 50*a* and shoulder 69, as best seen in FIG. 5.

The cutter assembly 10 is designed to be rotatably mounted on the mounting shaft 22 of die plate 12. Again referring to FIG. 5, it will be observed that the cutting head 30 may first be preliminarily assembled with the interconnected bearing housing 46 and spring housing 34, and this preliminary assembly is then positioned over the sections 24 and 26 of shaft 22, with the section 26 received within spindle 48, and with spring 72 in surrounding relationship to the section 24. The preliminary assembly is achieved by intermeshing of the splines 62 and 44 to form a driving connection between housing 34 and cutting head 30. Once the preliminary assembly is mounted on shaft 22, a retainer screw and washer 76 is threaded into the bore 28 of shaft 22 so as to rotatably secure the assembly 10 in place on the shaft 22. Screw and washer 76 are tightened to, for example, 38 ft-lbs, which preloads the spring 72 to the desired, predetermined degree. Of course, the degree of preloading is variable depending upon the specific design of the assembly 10.

At this point, it is only necessary to connect the drive shaft assembly 38 to bearing housing 46. The drive shaft assembly 38 is itself entirely conventional and includes a drive shaft 78, intermediate coupler 80, and an apertured connection plate 82. A series of connection screws 84 are used to secure plate 82 by threading the screws into corresponding threaded bores 86 provided in bearing housing 46. Other means could be employed to drive the cutter, such as direct coupling to a motor or use of a chain or belt drive, owing to the supported bearing structure forming a part of the cutter assembly.

The cutter assembly 10 possesses a number of advantages not found in prior art units. First, the use of the biasing structure to urge the cutting head 30 and blades 42 in an unrestrained fashion and at a substantially constant force assures that the cutting edges of the blades are maintained in contact with the die plate throughout operation of the assembly 10. This is true even if there is a degree of misalignment between the mounting shaft 22, cutter head 30, and the blades 42. Such misalignment is taken up by the self-aligning nature of the components of the cutter assembly. Moreover, the dynamic self-alignment of the parts of the cutter assembly 10 ensures long life of the cutter assembly. This in turn permits production of very small extrudate pieces, in the 500μ range.

As previously described, the cutting blades 42 have wide surfaces 42*a* which engage the outer face 12*a* of die plate 12, and are oriented at a small angle relative to face 12*a*. This is to be contrasted with typical prior art blades, such as those illustrated in FIG. 7. That is, the prior art cutting blades 88 have relatively narrow surfaces 88*a* and leading edges 88*b*, and are located at a greater angle relative to the die face. These design features can create significant gouges or scores on the adjacent outer die face 90, unless restrained. However, as explained, this restraint requirement is completely eliminated in the present invention, which significantly reduces any tendency of gouging or scoring.

All of the components of the cutter assembly are metallic, and the assembly 10 is devoid of any synthetic resin or rubber parts. This is preferable inasmuch as extruder operators wish to avoid such resilient components, which can overtime wear and break, potentially ending up in the product stream.

I claim:

1. A rotary cutter assembly operable to be mounted adjacent an outlet face of a die plate, said die plate including an elongated, outwardly extending, stationary mounting shaft, said cutter assembly comprising: a rotatable cutting head carrying at least two cutting blades adapted to engage said outlet face; a rotatable drive hub; a biasing structure; and a coupling structure operably coupling said drive hub with said cutting head for simultaneous rotation thereof, said biasing structure exerting an unrestrained force upon said cutting head with consequent unrestrained movement of said cutting head toward said outlet face during use of the rotary cutter assembly, while reducing any tendency of the blades to gouge or score said outlet face, said biasing structure comprising a coil spring located in surrounding relationship to at least a portion of said mounting shaft.

2. The assembly of claim 1, said coupling structure including cooperating splines on said cutting head and said drive hub.

3. The assembly of claim 1, said cutting head carrying a plurality of said cutting blades.

4. The assembly of claim 1, said drive hub including a bearing housing supporting at least one bearing.

5. A combination comprising:
   a die plate presenting an output face and including an elongated, outwardly extending, stationary mounting shaft; and
   a rotary cutter assembly, including—
      a rotatable cutting head carrying at least two cutting blades engaging said outlet face;
      a rotatable drive hub;
      a biasing structure; and
      a coupling structure operably coupling said drive hub with said cutting head for simultaneous rotation thereof, said biasing structure exerting an unrestrained force upon said cutting head with consequent unrestrained movement of said cutting head toward said outlet face during use of the rotary cutter assembly, while reducing any tendency of the blades to gouge or score said outlet face,
   said biasing structure comprising a coil spring located in surrounding relationship to at least a portion of said mounting shaft.

6. The combination of claim 5, said coupling structure including cooperating splines on said cutting head and said drive hub.

7. The combination of claim 5, said cutting head carrying a plurality of said cutting blades.

8. The combination of claim 5, said drive hub including a bearing housing supporting at least one bearing.

9. The combination of claim 8, there being a spring housing, and including coupling structure securing the bearing housing and the spring housing.

10. The combination of claim 5, said drive hub including a bearing housing supporting at least one bearing, said at least one bearing engaging said mounting shaft to support rotation of said cutting head and drive hub about the mounting shaft.

11. The combination of claim 5, there being a mounting fastener securing said drive hub to said mounting shaft, said fastener serving to preload said biasing structure.

12. The combination of claim 5, including a spring housing in surrounding relationship to said coil spring, there being coupling structure between said spring housing and said cutting head, said coil spring operable to unrestrainedly urge said cutting head toward said die outlet face.

13. The combination of claim 5, said cutting blades comprising circumferentially spaced apart, individual blade bodies.

14. The assembly of claim 1, including a spring housing in surrounding relationship to said coil spring, there being coupling structure between said spring housing and said cutting head, said coil spring operable to unrestrainedly urge said cutting head toward said die outlet face.

15. The assembly of claim 1, said cutting blades comprising circumferentially spaced apart, individual blade bodies.

* * * * *